United States Patent
Ries

(10) Patent No.: US 6,994,602 B2
(45) Date of Patent: Feb. 7, 2006

(54) SHIP PROPULSION SYSTEM

(75) Inventor: Günter Ries, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/497,148

(22) PCT Filed: Nov. 25, 2002

(86) PCT No.: PCT/DE02/04320

§ 371 (c)(1),
(2), (4) Date: May 28, 2004

(87) PCT Pub. No.: WO03/047962

PCT Pub. Date: Jun. 12, 2003

(65) Prior Publication Data

US 2004/0266277 A1    Dec. 30, 2004

(30) Foreign Application Priority Data

Nov. 29, 2001  (DE) ................................ 101 58 757

(51) Int. Cl.
  *B60L 11/16*   (2006.01)
(52) U.S. Cl. ........................................... 440/6; 440/51
(58) Field of Classification Search ................ 440/6, 440/51
  See application file for complete search history.

(56) References Cited

U.S. PATENT DOCUMENTS

| 5,078,628 A | | 1/1992 | Garis |
| 5,403,216 A | * | 4/1995 | Salmi et al. .................... 440/6 |
| 5,586,437 A | * | 12/1996 | Blecher et al. .............. 62/47.1 |
| 6,165,031 A | * | 12/2000 | Lonngren et al. ............. 440/51 |

FOREIGN PATENT DOCUMENTS

| DE | 692 13 990 T2 | 2/1997 |
| DE | 196 27 323 A1 | 1/1998 |
| DE | 197 53 320 A1 | 6/1998 |
| DE | 198 56 425 A1 | 7/1999 |
| DE | 198 26 229 C2 | 9/2000 |
| WO | WO 01/52393 A1 | 7/2001 |

OTHER PUBLICATIONS

Diamond Drill Radia: "WPI World Patent Information Derwent, Derwent, GB", WPI World Patent Information Derwent, Derwent, GB, vol. 39, NR. 88, XP002042370.

* cited by examiner

*Primary Examiner*—Jesus D. Sotelo
(74) *Attorney, Agent, or Firm*—Harness, Dickey & Pierce, P.L.C.

(57) ABSTRACT

A ship propulsion system includes at least one marine propeller, at least one electric motor which drives the at least one marine propeller, and an inverter-fed power supply system which supplies the at least one electric motor with electric power. The power supply system includes at least one drive machine and at least one generator driven thereby. The at least one electric motor and the at least one generator are configured as three-phase synchronous machines. In order to reduce losses per kW installed power and thus to allow for a stronger energizing field in the stator winding, the at least one electric motor configured as a three-phase synchronous machine and/or the at least one generator configured as a three-phase synchronous machine of the power supply system is/are provided with an air-gap three-phase winding devoid of iron grooves as the power supply system. The bundle conductors of the winding are made from insulated thin cooper wires that are disposed in an annular gap between a rotor and a laminated iron yoke, and the air gap three phase winding is reinforced by a plastic structure and/or embedded in or impregnated with resin and to which a pertaining cooling device is connected by which the heat produced in the cooling device is dissipated.

33 Claims, 4 Drawing Sheets

SHIP PROPULSION SYSTEM

This application is the national phase under 35 U.S.C. § 371 of PCT International Application No. PCT/DE02/04320 which has an International filing date of Nov. 25, 2002, which designated the United States of America and which claims priority on German Patent Application number DE 101 58 757.0 filed Nov. 29, 2001, the entire contents of which is hereby incorporated herein by reference.

FIELD OF THE INVENTION

The invention generally relates to a marine propulsion system. The system preferably includes at least one vessel propeller, at least one electric motor by which the at least one vessel propeller can be driven, and a converter-fed power supply, by which the at least one electric motor can be supplied with electric power. The system further preferably includes at least one drive machine and at least one generator which can be driven by it, with the at least one electric motor and the at least one generator being in the form of three-phase synchronous machines.

BACKGROUND OF THE INVENTION

Diesel/electric marine propulsion systems are known, whose power supply has synchronous generators which are accommodated at some suitable point in the vessel's hull, and which themselves feed converter-fed synchronous or else asynchronous motors. The electric motors which drive the vessel propellers may, for example, be arranged as in-board motors, and may drive the vessel propellers via shaft systems.

Furthermore, pod propulsion systems are known, which have an asynchronous motor, or a synchronous motor with permanent-magnet excitation, arranged in a motor gondola which can be rotated. The motor gondola is arranged outside the vessel's hull and may have one or two vessel screws. The heat losses from the electric motor are in this case dissipated solely by the external surface of the motor gondola to the sea water. The asynchronous motors and generators have air/water heat exchangers.

SUMMARY OF THE INVENTION

An embodiment of the invention includes an object of developing a marine propulsion system with reduced losses for each kilowatt of its stored power. Preferably, it can be designed with an increased excitation field on the winding.

According to an embodiment of the invention, an object may be achieved in that the at least one electric motor (which is in the form of a three-phase synchronous machine) and/or the at least one generator (which is in the form of a three-phase synchronous machine) for the power supply has or have an air gap three-phase winding without any slots in the iron as the stator winding, whose bundled conductors are formed from insulated thin copper wires which are arranged in an annular gap between a rotor and a laminated magnetic iron yoke, which is reinforced by way of a plastic structure and/or is encapsulated or impregnated with resin, and which is connected to a cooling apparatus associated with it, by which heat losses that are produced in it can be dissipated.

The configuration of the air gap three-phase winding results in no iron slots being at ground potential. Furthermore, the potential differences and field strengths are reduced in comparison to stator conductors. Thus, greater isolating distances are possible in the case of the air gap three-phase winding. This is particularly advantageous for high-voltage motors.

In one embodiment, when the at least one electric motor (which is in the form of a three-phase synchronous machine) and/or the at least one generator (which is in the form of a three-phase synchronous machine) for the power supply has or have a rotating field winding on the rotor composed of high-temperature superconductor (HTSL) wire, which is arranged in a vacuum-insulated cryostat and can be cryogenically cooled to a temperature of between 15 and 77 K, the excitation field may be about two Teslas instead of one Tesla. As such, large free radial air gaps or annular gaps are permissible. This results in the capability to bring the coolant into direct contact with the air gap three-phase winding.

According to one advantageous embodiment of the marine propulsion system according to the invention, the air gap three-phase winding (which has no slots in the iron) of the at least one electric motor and/or of the at least one generator for the power supply is installed in an annular container composed of insulating material, which is surrounded by the laminated magnetic iron yoke. In this case, adequate dissipation of the heat losses from the air gap three-phase winding via the laminated magnetic iron yoke on its own is no longer possible, so that the measures according to an embodiment of the invention are required.

The annular container which holds the air gap three-phase winding without any slots in the iron is advantageously formed from glass-fiber-reinforced plastic.

The cooling apparatus which is associated with the air gap three-phase winding without any slots in the iron advantageously has a coolant circuit which introduces the coolant into the annular container on one end face of the annular container, which holds the air gap three-phase winding, and carries the coolant away from the annular container on its other end face with the coolant flowing between the first end face and the second end face of the annular container between the air gap three-phase winding and the annular container and, possibly, through further longitudinal channels in the air gap three-phase winding.

An insulating cooling liquid, for example oil, MIDEL or the like, is provided as the coolant for the cooling apparatus which is associated with the air gap three-phase winding without any slots in the iron.

In order to dissipate heat losses from the coolant circuit of the cooling apparatus which is associated with the air gap three-phase winding without any slots in the iron, a heat exchanger, which can be cooled down again by using the cooling water system in the vessel, is expediently arranged in this coolant circuit. Alternatively, the heat exchanger which is arranged in the coolant circuit of the cooling apparatus which is associated with the air gap three-phase winding without any slots in the iron can be cooled down again by means of sea water.

The heat exchanger for the coolant circuit of the cooling-apparatus which is associated with the air gap three-phase winding without any slots in the iron can be arranged fixed in the vessel's hull.

According to a further advantageous embodiment of the marine propulsion system according to an embodiment of the invention, this system is in the form of a pod propulsion system, whose at least one electric motor is arranged in a motor gondola of the pod propulsion system.

The cooling lines which form the coolant circuit of the cooling apparatus which is associated with the air gap three-phase winding without any slots in the iron are expediently designed to be flexible.

In order to assist the heat dissipation from the laminated magnetic iron yoke of the at least one electric motor, the iron yoke is preferably shrunk into the housing of the motor gondola of the pod propulsion system.

According to a further expedient embodiment of the marine propulsion system according to an embodiment of the invention, the heat exchanger for the coolant circuit of the cooling apparatus which is associated with the air gap three-phase winding without any slots in the iron is arranged in an azimuth module (which can rotate) of the pod propulsion system.

If the heat exchanger for the coolant circuit of the cooling apparatus which is associated with the air gap three-phase winding without any slots in the iron is arranged in a strut module in the pod propulsion system, with the tubes of the heat exchanger being thermally connected to the wall of the strut module, this allows sea water to be used in a simple manner for dissipating heat losses from the coolant circuit. In order to simplify any maintenance and repair work on the cooling apparatus which is associated with the air gap three-phase winding without any slots in the iron, it is expedient for a circulation pump, which is arranged in its coolant circuit, to be arranged in or on the azimuth module (which can be rotated) of the pod propulsion system.

According to a further advantageous embodiment of the marine propulsion system according to an embodiment of the invention, the cooling apparatus which is associated with the air gap three-phase winding without any slots in the iron of the at least one electric motor, and/or of the at least one generator for the power supply, has at least one fan impeller, which is arranged on a rotor axis and by which a cooling gas flow, for example a cooling air flow, can be passed into the annular space between the air gap three-phase winding and the rotor and/or into the annular space between the air gap three-phase winding and the laminated magnetic iron yoke of the at least one electric motor or generator. The heat losses which are produced in the annular gap between the rotor and the iron yoke can then be dissipated from the annular gap by way of the cooling air flow.

A fan impeller is expediently provided on each of the two end faces of the rotor, in which case each fan impeller is then designed in a suitable manner to produce a cooling gas flow, which extends approximately over half the axial length of the electric motor.

In order to make it easier to dissipate the heat losses from the annular gap between the rotor on the one hand and the iron yoke on the other hand, it is advantageous for the air gap three-phase winding without any slots in the iron to be designed with cooling slots which extend in its radial direction and by means of which heat losses which are produced in the air gap three-phase winding can be dissipated to this cooling gas flowing through it.

The radial cooling slots in the air gap three-phase winding without any slots in the iron may expediently be formed by Teflon filling bodies which can be inserted between the stator bars of the air gap three-phase winding during its assembly, and can be removed after the encapsulation or impregnation process.

The cooling apparatus is expediently provided with a guide plate arrangement through which the cooling gas flows (which are produced by the two fan impellers) are passed into the annular space between the rotor and the air gap three-phase winding, without any slots in the iron, in the direction of the axial central area of the at least one electric motor and/or generator, with the cooling gas flows being passed through the radial cooling slots in the air gap three-phase winding from the annular space between the rotor and the air gap three-phase winding into the annular space between the air gap three-phase winding and the laminated magnetic iron yoke, and then back to the end faces of the rotor.

Cooling air can be sucked in a less complex manner through the fan impellers if an inlet opening through which the fan impeller or impellers sucks or suck in cooling gas is formed in a housing of the at least one electric motor and/or generator, for each fan impeller.

The heated cooling gas can be dissipated in a simple manner if one or more outlet openings is or are formed in the housing of the at least one electric motor and/or generator, through which the cooling gas is passed out of the housing of the at least one electric motor and/or generator after it has once again left the annular gap between the rotor and the iron yoke.

The inlet opening or the inlet openings and the outlet opening or the outlet openings is or are advantageously arranged on one or in each case on one of the two end faces of the rotor in the housing of the at least one electric motor and/or generator.

In a further expedient embodiment of the marine propulsion system according to an embodiment of the invention, the cooling gas flow is carried in a circuit, and can be cooled down again by way of gas/water heat exchangers.

At least one gas/water heat exchanger is in each case advantageously arranged within the housing of the at least one electric motor and/or generator, in one axial space or in both axial spaces between one end face or both end faces of the at least one electric motor and/or generator and one end wall or both end walls of the housing. The gas/water heat exchanger is connected to a cooling circuit in the vessel and past which the heated cooling gas flow which emerges from the annular gap between the rotor and the iron yoke is passed, before it is forced back into the annular gap by the at least one fan impeller. With this embodiment, there is no need for any additional cooling gas circuits, or the like.

Alternatively, it is possible to arrange the gas/water heat exchanger or exchangers outside the housing of the at least one electric motor and/or generator.

BRIEF DESCRIPTION OF THE DRAWINGS

Further advantages, features and details of the invention will become evident from the description of illustrated embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
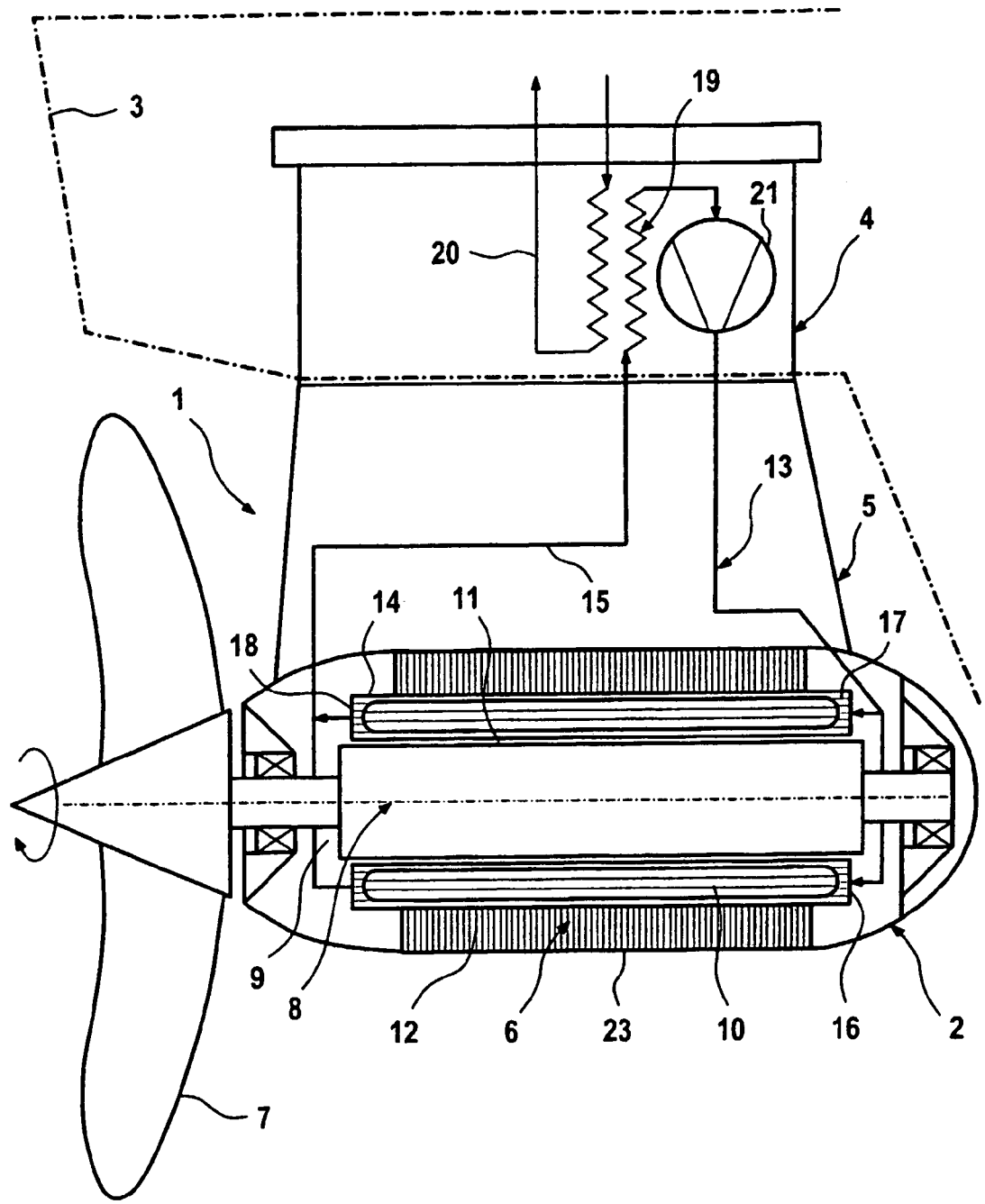
FIG. 1 shows an outline illustration, in the form of a longitudinal section, of one embodiment of the marine propulsion system according to an embodiment of the invention.
Figure 2:
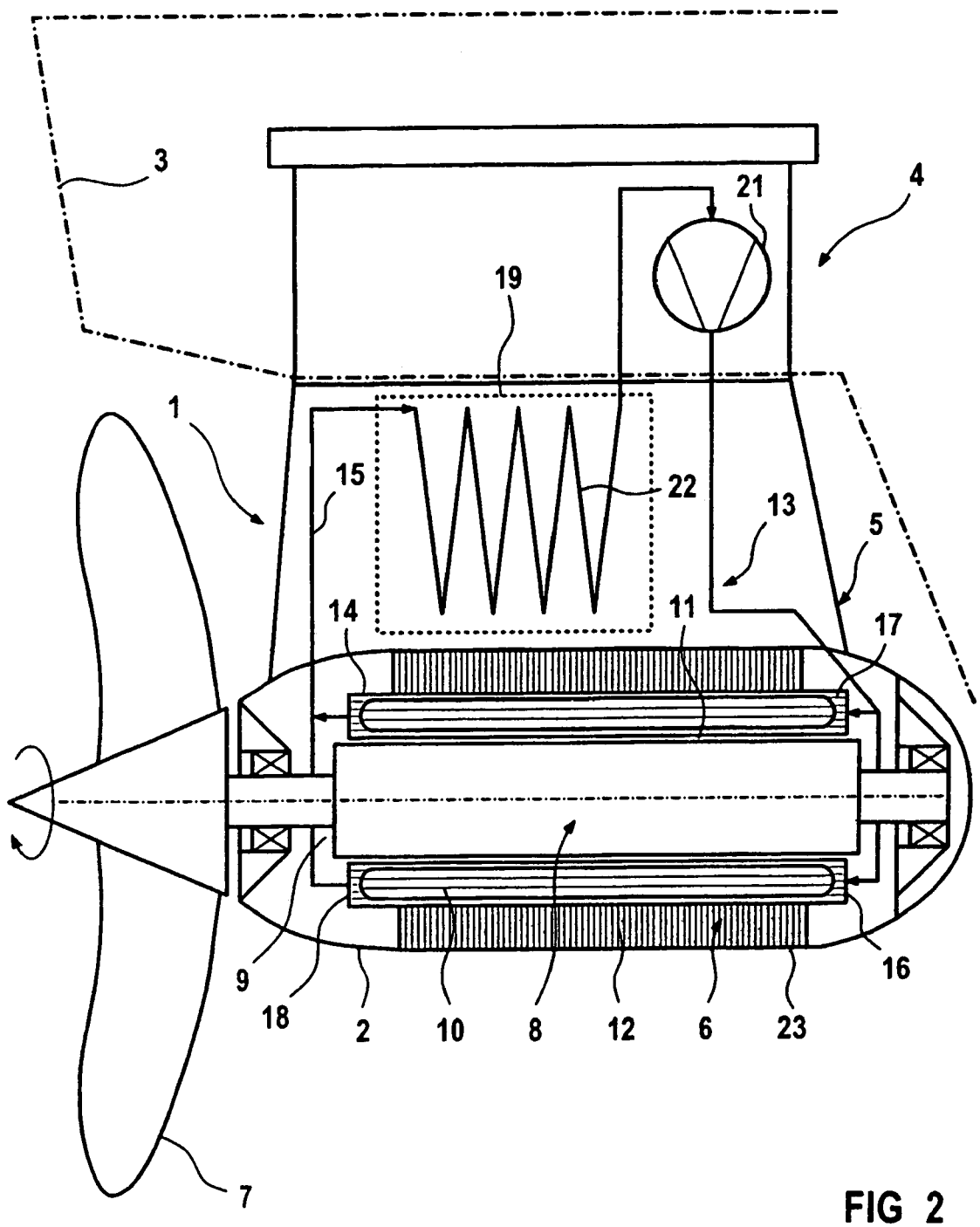
FIG. 2 shows an outline illustration, in the form of a longitudinal section, of a further embodiment of the marine propulsion system according to an embodiment of the invention.

A first embodiment (which is illustrated in the form of a cross section in FIG. 1) of a marine propulsion system according to the invention in the form of a pod propulsion system 1 has a motor gondola 2 which is arranged underneath a vessel's hull 3, only part of which is illustrated, by dashed lines, in FIGS. 1 and 2.

Within the vessel's hull 3, the pod propulsion system 1 has an azimuth module 4 which can be rotated and is firmly connected to a motor gondola 2, through the vessel's hull 3, by means of a strut module 5.

The pod propulsion system 1 can be rotated with respect to the vessel's hull 3 about a vertical axis.

The pod propulsion system 1 shown in FIG. 1 has an electric motor 6 arranged within the motor gondola 2. This electric motor 6 is used to drive a vessel propeller 7, which is arranged at the rear end of the motor gondola 2 such that it can rotate.

The electric motor 6 is in the form of a three-phase synchronous machine and has a rotor 8 which is equipped with a rotating field winding, which is not shown in any more detail in the figures, that is composed of HTSL (high-temperature superconductor) wire. This rotor 8 is accommodated within a cryostat 9, which is designed to be vacuum-insulated and by which the rotating field winding composed of HTSL wire for the rotor can be cryogenically cooled to a temperature between 15 and 77 K.

The electric motor 6, which is in the form of a three-phase synchronous machine. It furthermore has an air gap three-phase or stator winding 10, which has no iron slots or iron teeth. The air gap three-phase winding 10 without any slots in the iron has bundled conductors composed of insulated thin copper wires, and is arranged in an annular gap 11 between the rotor 8 and a laminated magnetic iron yoke 12.

In order to ensure adequate dissipation of the heat losses that are produced in the air gap three-phase winding 10, despite the lack of iron teeth or slots, the high proportion of insulating materials and the long distances to the laminated magnetic iron yoke 12, the air gap three-phase winding 10 is provided with a cooling apparatus 13.

For mechanical reasons, the air gap three-phase winding 10 without any slots in the iron is provided with a plastic structure, which reinforces it, and/or is encapsulated or impregnated with a suitable resin or the like.

In the embodiment of the marine propulsion system that is shown in FIGS. 1 and 2 and is in the form of a pod propulsion system 1, the air gap three-phase winding 10 without any slots in the iron is accommodated in an annular container 14. The annular container 14 is composed of an insulating material, for example of a glass-fiber-reinforced plastic (GRP).

This annular container 14, which forms the reinforcing plastic structure in the embodiment shown in FIGS. 1 and 2, is surrounded by the laminated magnetic iron yoke 12, which is likewise annular.

The cooling apparatus 13, which is associated with the annular container 14 and with the air gap three-phase winding 10 without any slots in the iron that is accommodated in it, has a coolant circuit 15 which introduces cooled coolant 17 into the annular container 14 on one end face 16 and receives and carries away again the coolant 17 (which has then been heated by the heat losses that are produced in the air gap three-phase winding 10) on the other end face 18 of the annular container 14.

The coolant 17 is passed over the air gap three-phase winding in its axial direction, through the annular spaces between the annular container 14 on the one hand and the air gap three-phase winding 10 on the other hand, and possibly through further longitudinal channels in the air gap three-phase winding 10.

An insulating cooling liquid, for example oil, MIDEL or the like, is used as the coolant 17.

In the embodiment of the pod propulsion system 1 shown in FIG. 1, the coolant circuit 15 of the cooling apparatus 13 has a heat exchanger 19, which is provided in or on the azimuth module 4 (which can be rotated) of the pod propulsion system 1. The heat exchanger 19 is cooled by a cooling water system 20 within the vessel.

Instead of being arranged in or on the azimuth module 4 (which can be rotated) of the pod propulsion system 1, the heat exchanger 19 may also be arranged at any other suitable point within the vessel's hull 3.

Furthermore, the coolant circuit 15 has a circulation pump 21 which, in the exemplary embodiments illustrated in FIGS. 1 and 2, is arranged in the azimuth module 4 (which can be rotated) of the pod propulsion system 1. The circulation pump 1 can accordingly be serviced and if necessary repaired or replaced with comparatively little effort, since its arrangement in the azimuth module 4 (which can be rotated) of the pod propulsion system 1 means that it is easily accessible.

The cooling lines for the coolant circuit 15 are designed to be flexible.

The embodiment of the pod propulsion system 1 as shown in FIG. 2 differs from that shown in FIG. 1 in that the heat exchanger 19 for the coolant circuit 15 of the cooling apparatus 13 which is associated with the annular container 14 and with the air gap three-phase winding 10 that is held in it is arranged in the strut module 5 of the pod propulsion system 1. The meandering tubes 22 in the embodiment of the heat exchanger 19 shown in FIG. 2 are thermally connected to the wall of the strut module 5, so that they emit the heat losses contained in the coolant 17 flowing through them from the air gap three-phase winding 10 to the sea water surrounding the strut module 5.

In the embodiments of the pod propulsion system 1 illustrated in FIGS. 1 and 2, the laminated magnetic iron yoke 12 is shrunk into the housing 13 of the motor gondola 2, so that heat losses which are produced in the iron yoke 12 can be emitted through the housing 23 directly to the sea water surrounding the motor gondola 2.

Figure 3A:
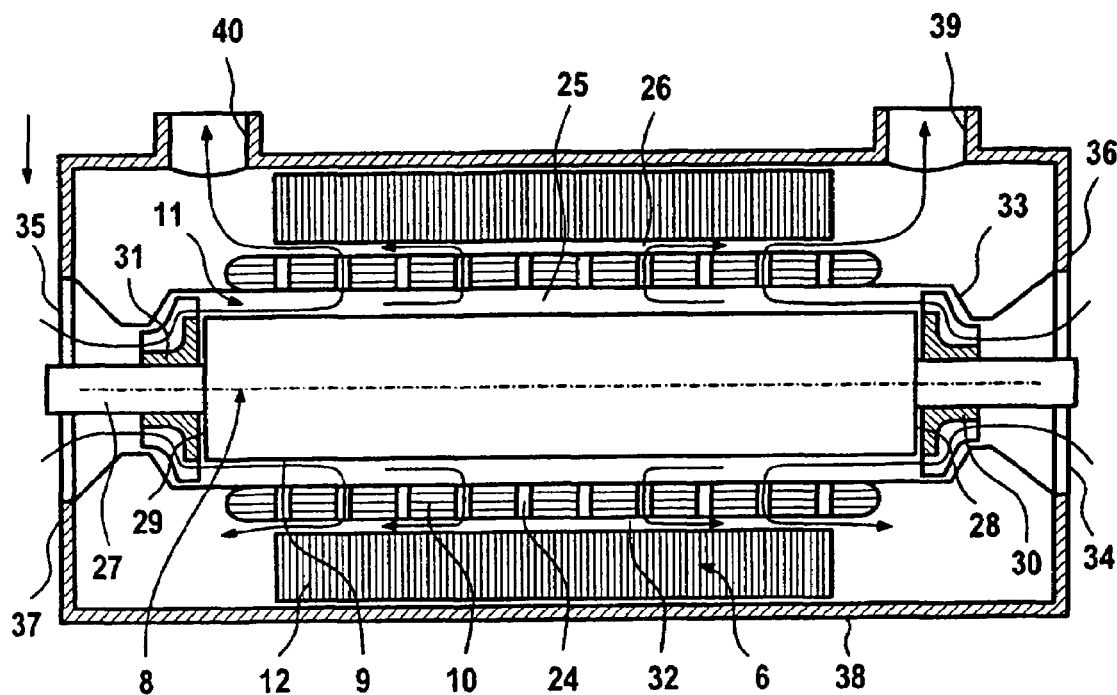
FIG. 3a shows a longitudinal section through an electric motor or generator of a marine propulsion system according to an embodiment of the invention.
Figure 3B:
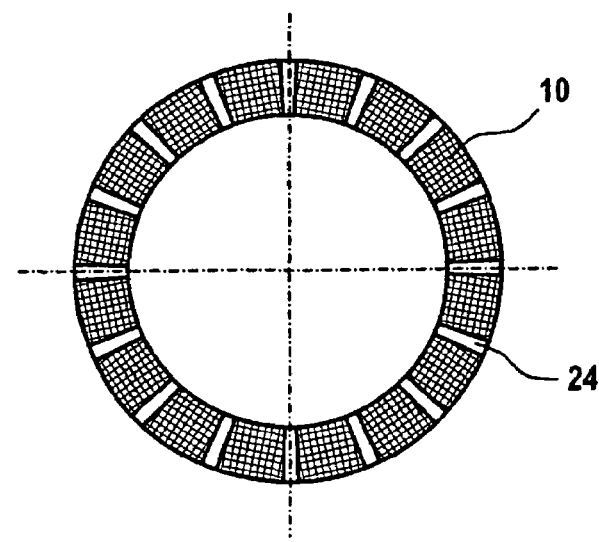
FIG. 3b shows a cross-sectional illustration through an air gap three-phase winding of a marine propulsion system according to an embodiment of the invention.
Figure 4:
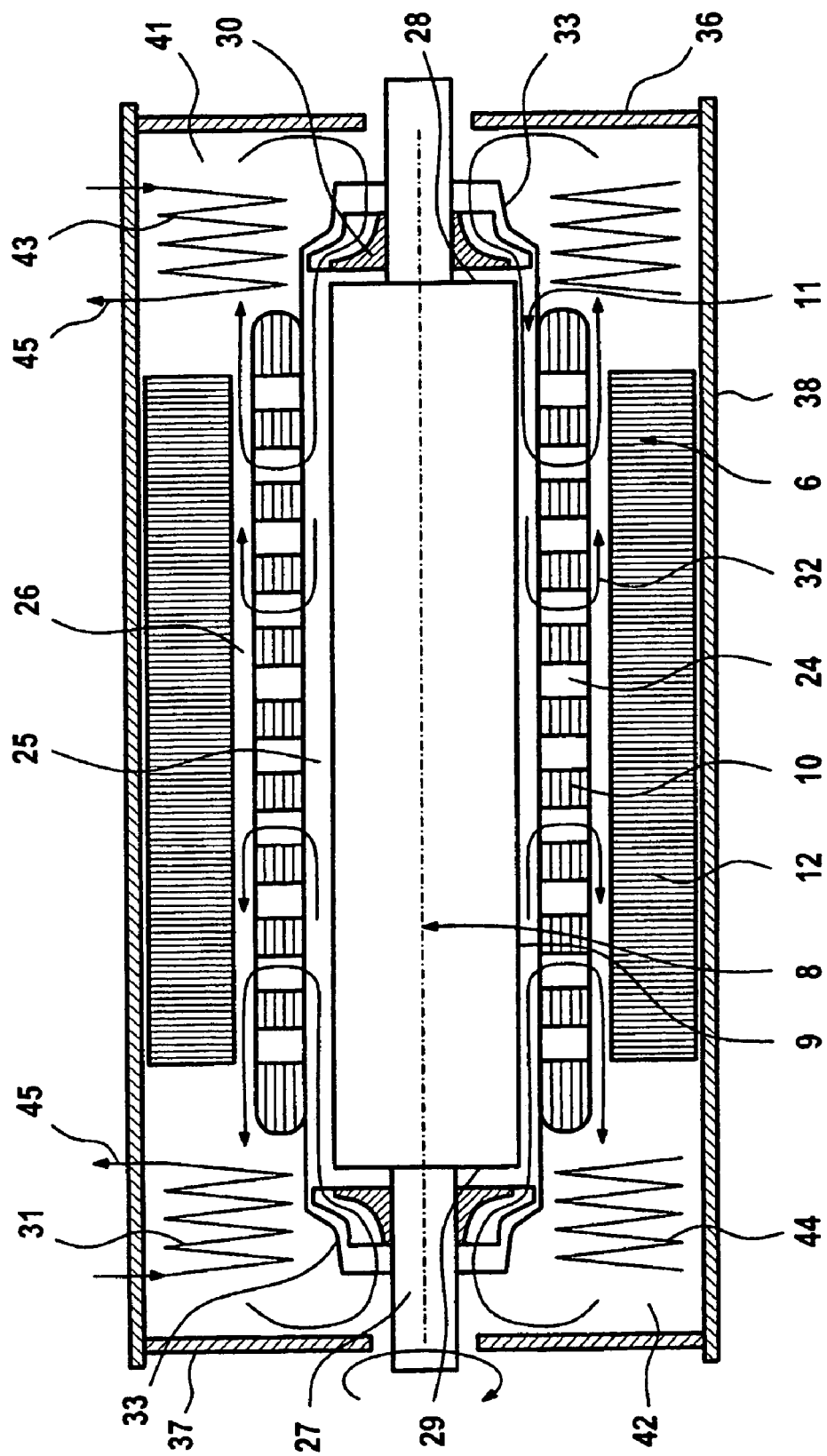
FIG. 4 shows a longitudinal section through a further embodiment of an electric motor or generator for the marine propulsion system according to an embodiment of the invention.

In the embodiments of the marine propulsion system according to the invention as shown in FIGS. 3a to 4, the electric motor 6 is arranged in a suitable manner on or in the vessel.

The air gap three-phase winding 10, without any slots in the iron, is accommodated in the annular gap 11 between the rotor 8, whose rotating field winding is accommodated in the cryostat 9, and the laminated magnetic iron yoke 12.

This air gap three-phase winding has cooling slots 24 running in its radial direction. These radial cooling slots 24 in the air gap three-phase winding 10 are produced by inserting suitably shaped Teflon filling bodies between their stator bars during the assembly of the air gap three-phase winding 10, with these Teflon filling bodies being removed after the encapsulation or impregnation of the air gap three-phase winding 10.

These radial cooling slots 24, which pass through the air gap three-phase winding 10, connects an inner annular intermediate space 25. This space is formed between the outer casing surface of the rotor 8 and the inner casing surface of the air gap three-phase winding 10. The connection is made to an outer annular intermediate space 26, formed between the outer casing surface of the air gap three-phase winding 10 and the inner casing surface of the annular laminated magnetic iron yoke 12.

The configuration, arrangement and profile of the radial cooling slots 24 in the air gap three-phase winding 10 can best be seen by viewing FIGS. 3a and 4 together with FIG. 3b.

The configuration of the electric motor 6 shown in FIGS. 3a to 4 is also suitable in a similar manner for a generator, which may be arranged at any desired point in the vessel's hull 3.

The rotor 8 of the electric motor 6 is seated on a rotor shaft 27, on which a fan impeller 30 or 31, respectively, is seated on the two end faces 28, 29 of the rotor 8.

The fan impellers 30 and 31, respectively, produce a cooling air flow 32 from the end face 28 and from the end face 29, respectively, of the rotor 8 into the internal annular space 25 between the casing surface of the rotor 8 and the inner casing surface of the air gap three-phase winding 10. The capacitive configuration of the fan impellers 30, 31 is chosen such that the cooling air flows 32 arrive approximately in an axial central region of the rotor 8.

The cooling air flow 32 passes through the cooling slots 24 in the air gap three-phase winding 10 into the outer annular space 26 between the outer casing surface of the air gap three-phase winding 10 and the inner casing surface of the laminated magnetic iron yoke 12. The cooling air flow 32 passes from this outer annular intermediate space 26 to the two end faces 28, 29 and emerges again close to these two end faces 28, 29 of the rotor 8.

When the cooling air flow 32 passes through the inner annular intermediate space 25, the radial cooling slots 24 in the air gap three-phase winding 10 and the outer annular intermediate space 26, the heat losses from the air gap three-phase winding 10 and from the laminated magnetic iron yoke 12 are transmitted to the cooling air, and are dissipated from the annular gap 11.

In the embodiment of the electric motor 6 shown in FIG. 3a, a guide plate arrangement 33 is provided in the area of each of the two fan impellers 30, 31, by which the cooling air which is to be introduced into the inner annular intermediate space 25 is separated from heated cooling air emerging from the outer annular intermediate space 26. In the exemplary embodiment of the electric motor 6 shown in FIG. 3a, the two guide plate arrangements 33 extend as far as a respective inlet opening 34 or 35, which are formed in the respective end walls 36 and 37 of a housing 38, which accommodates the electric motor 6 in the embodiments shown in FIGS. 3a and 4.

The heated cooling air flow 32 which emerges from the outer annular intermediate space 26 is passed out of the housing 38 through outlet openings 39, 40, which are formed close to the end walls 36, 37 in the housing 38.

A line connection may be provided between the inlet openings 34, 35 on the one hand and the outlet openings 39, 40 on the other hand, in which the cooling air is cooled down by use of a heat exchanger provided there, to such an extent that it can be reintroduced into the inner annular intermediate space 25 by use of the fan impellers 30, 31.

In contrast to the embodiment of the electric motor 6 shown in FIG. 3a, in the case of the embodiment of the electric motor 6 shown in FIG. 4, a gas/water heat exchanger 43 or 44, respectively, is arranged in the two axial spaces 41, 42 between the end walls 36, 37 of the housing 38 and the end faces 28, 29 of the rotor 8 and of the electric motor 7, respectively. The cooling air flow 32 is effectively carried in two circuits within the housing 38 through the two axial intermediate spaces 41, 42, with the cooling air flow, which is heated by the heat losses from the air gap three-phase winding 10 and from the laminated magnetic iron yoke 12 and emerges from the outer annular intermediate space 26, being cooled by the gas/water heat exchangers 43 and 42, respectively, before the cooling air flow 32, which has then been cooled, is forced back into the inner annular intermediate space 25 by means of the two fan impellers 30, 31.

In the embodiment shown in FIG. 4, the guide plate arrangement 33 is designed such that the only cooling air which is sucked in by the fan impellers 30, 31 is that which has already flowed past the gas/water heat exchanger 43 or 44.

The two gas/water heat exchangers 43, 44 are connected to a cooling circuit 45 in the vessel.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A marine propulsion system, comprising:
   at least one vessel propeller;
   at least one electric motor, by which the at least one vessel propeller is drivable; and
   a converter-fed power supply, adapted to supply the at least one electric motor with electric power, and including
   at least one drive machine and at least one generator, adapted to be driven by the at least one drive machine, wherein the at least one electric motor and the at least one generator are three-phase synchronous machines, wherein at least one of the at least one electric motor and the at least one generator includes a rotor and a stator winding arranged following one another in the radial direction of at least one of the at least one electric motor and the at least one generator, wherein the stator winding includes an air gap three-phase winding whose bundled conductors are formed from insulated thin copper wires arranged in an annular gap between the rotor and an iron yoke, wherein the air gap three phase winding is at least one of reinforced by a plastic structure and at least one of encapsulated and impregnated with resin, and is connected to a cooling apparatus by which heat losses produced are adapted to be dissipated, wherein the air gap three-phase winding includes no slots in the iron yoke and the iron yoke is in the form of a laminated magnetic iron yoke, and wherein the air gap three-phase winding of at least one of the at least one electric motor and at least one generator for the power supply is installed in an annular container including insulating material surrounded by the laminated magnetic iron yoke, and wherein the cooling apparatus includes a coolant circuit adapted to introduce coolant into the annular container on one end face of the annular container holding the air gap three-phase winding, and adapted to carry the coolant away from the annular container on its other end face with the coolant flowing between the first end face and the second end face of the annular container between the air gap three-phase winding and the annular container.

2. The marine propulsion system as claimed in claim 1, wherein the at least one of the electric motor and the generator includes a rotating field winding on the rotor composed of high-temperature superconductor wire, arranged in a vacuum-insulated cryostat and cryogenically coolable to a temperature between 15 and 77 K.

3. The marine propulsion system as claimed in claim 2, wherein the cooling apparatus includes at least one fan impeller, arranged on a rotor axis and by which a cooling gas flow is passable into at least one of the annular space between the air gap three-phase winding and the rotor and an annular space between the air gap three-phase winding and the laminated magnetic iron yoke of the at least one electric motor or generator.

4. The marine propulsion system as claimed in claim 1, wherein the annular container which includes the air gap three-phase winding without any slots in the iron yoke is formed from glass-fiber-reinforced plastic.

5. The marine propulsion system as claimed in claim 1, wherein an insulating cooling liquid is provided as the coolant for the cooling apparatus.

6. The marine propulsion system as claimed in claim 1, further comprising:
a heat exchanger, arranged in the coolant circuit of the cooling apparatus, is coolable by use of the cooling water system of the vessel.

7. The marine propulsion system as claimed in claim 6, wherein the heat exchanger is arranged fixed in the vessel's hull.

8. The marine propulsion system as claimed in claim 1, further comprising:
a heat exchanger, arranged in the coolant circuit of the cooling apparatus, is coolable by use of seawater.

9. The marine propulsion system as claimed in claim 8, wherein the heat exchanger is arranged fixed in the vessel's hull.

10. The marine propulsion system as claimed in claim 1, wherein the marine propulsion system is in the form of a pod propulsion system and wherein at least one electric motor is arranged in a motor gondola of the pod propulsion system.

11. The marine propulsion system as claimed in claim 10, wherein the laminated magnetic iron yoke is shrunk into the housing of the motor gondola of the pod propulsion system.

12. The marine propulsion system as claimed in claim 11, wherein a heat exchanger for the coolant circuit is arranged in an azimuth module of the pod propulsion system.

13. The marine propulsion system as claimed in claim 11, wherein a heat exchanger for the coolant circuit is arranged in a strut module of the pod propulsion system, with tubes of the heat exchanger being thermally connected to the wall of the strut module.

14. The marine propulsion system as claimed in claim 10, wherein a heat exchanger for the coolant circuit is arranged in an azimuth module of the pod propulsion system.

15. The marine propulsion system as claimed in claim 10, wherein a heat exchanger for the coolant circuit is arranged in a strut module of the pod propulsion system, with the tubes of the heat exchanger being thermally connected to a wall of the strut module.

16. The marine propulsion system as claimed in claim 10, wherein a circulation pump, arranged in the coolant circuit, is arranged in or on an azimuth module of the pod propulsion system.

17. The marine propulsion system as claimed in claim 1, wherein the coolant circuit is adapted to carry the coolant through further longitudinal channels in the air gap three-phase winding.

18. The marine propulsion system as claimed in claim 1, wherein cooling lines, forming the coolant circuit for the cooling apparatus are designed to be flexible.

19. The marine propulsion system as claimed in claim 18, wherein the marine propulsion system is in the form of a pod propulsion system and wherein a heat exchanger for the coolant circuit is arranged in an azimuth module of the pod propulsion system.

20. The marine propulsion system as claimed in claim 18, wherein the marine propulsion system is in the form of a pod propulsion system and wherein a heat exchanger for the coolant circuit is arranged in a strut module of the pod propulsion system, with tubes of the heat exchanger being thermally connected to the wall of the strut module.

21. The marine propulsion system as claimed in claim 1, wherein the cooling apparatus includes at least one fan impeller, arranged on a rotor axis and by which a cooling gas flow is passable into at least one of the annular space between the air gap three-phase winding and the rotor and an annular space between the air gap three-phase winding and the laminated magnetic iron yoke of the at least one electric motor or generator.

22. The marine propulsion system as claimed in claim 21, wherein one fan impeller is provided on each of the two end faces, respectively, of the rotor.

23. The marine propulsion system as claimed in claim 21, wherein the air gap three-phase winding includes cooling slots which extend in its radial direction and by which heat losses which are produced in the air gap three-phase winding are dissipated to this cooling gas flowing through it.

24. The marine propulsion system as claimed in claim 23, wherein the radial cooling slots in the air gap three-phase winding are formed by Teflon filling bodies, insertable between stator bars of the air gap three-phase winding during its assembly, and can be removable after at least one of an encapsulation and impregnation process.

25. The marine propulsion system as claimed in claim 24, further comprising a guide plate arrangement, through which the cooling gas flows are passed into the annular space between the rotor and the air gap three-phase winding, without any slots in the iron yoke, in the direction of the axial central area of the at least one electric motor or generator, with the cooling gas flows being passed through the radial cooling slots in the air gap three-phase winding from the annular space between the rotor and the air gap three-phase winding into the annular space between the air gap three-phase winding and the laminated magnetic iron yoke, and then back to the end faces of the rotor.

26. The marine propulsion system as claimed in claim 23, further comprising a guide plate arrangement, through which the cooling gas flows are passed into the annular space between the rotor and the air gap three-phase winding, without any slots in the iron yoke, in the direction of the axial central area of the at least one electric motor or generator, with the cooling gas flows being passed through the radial cooling slots in the air gap three-phase winding from the annular space between the rotor and the air gap three-phase winding into the annular space between the air gap three-phase winding and the laminated magnetic iron yoke, and then back to the end faces of the rotor.

27. The marine propulsion system as claimed in claim 21, wherein an inlet opening, through which the fan impeller sucks in cooling gas is formed in a housing of the at least one electric motor or generator, for each fan impeller.

28. The marine propulsion system as claimed in claim 21, wherein at least one outlet opening is formed in the housing of the at least one electric motor or generator, through which the cooling gas is passed out of the housing of the at least one electric motor or generator after it has once again left the annular gap between the rotor and the iron yoke.

29. The marine propulsion system as claimed in claim 28, wherein an inlet opening and the outlet opening are arranged on one of the two end faces of the rotor in the housing of the at least one electric motor or generator.

30. The marine propulsion system as claimed in claim 21, wherein the cooling gas flow is carried in a circuit, and is coolable again by use of gas/water heat exchangers.

31. The marine propulsion system as claimed in claim 21, wherein at least one gas/water heat exchanger is arranged within the housing of the at least one electric motor or generator, in one axial space or in both axial spaces between at least one end face of the at least one electric motor or generator and at least one end wall of the housing, which gas/water heat exchanger is connected to a cooling circuit in the vessel and past which the heated cooling gas flow which emerges from the annular gap between the rotor and the iron yoke is passed, before it is forced back into the annular gap by the at least one fan impeller.

32. The marine propulsion system as claimed in claim 21, wherein a gas/water heat exchanger is arranged outside the housing of the at least one electric motor or generator.

33. A marine propulsion system, comprising:
at least one vessel propeller;
at least one electric motor, by which the at least one vessel propeller is drivable; and
at least one drive machine and at least one generator, adapted to be driven by the at least one drive machine, wherein at least one of the at least one electric motor and the at least one generator is a three-phase synchronous machine including a rotor and a stator winding, wherein the stator winding includes an air gap three-phase winding whose conductors are formed from wires arranged in an annular gap between the rotor and an iron yoke, wherein the iron yoke is connected to a cooling apparatus by which heat losses produced are adapted to be dissipated, wherein the air gap three-phase winding includes no slots in the iron yoke and the iron yoke is in the form of a laminated magnetic iron yoke, and wherein the air gap three-phase winding is installed in an annular container including insulating material surrounded by the laminated magnetic iron yoke, and wherein the cooling apparatus includes a coolant circuit adapted to introduce the coolant into the annular container on one end face of the annular container holding the air gap three-phase winding, and adapted to carry the coolant away from the annular container on its other end face with the coolant flowing between the first end face and the second end face of the annular container between the air gap three-phase winding and the annular container.

* * * * *